United States Patent
Yamaguchi et al.

(10) Patent No.: US 8,295,643 B2
(45) Date of Patent: Oct. 23, 2012

(54) DEVICE AND ASSOCIATED METHODOLOGY FOR MEASURING THREE-DIMENSIONAL POSITIONS BASED ON RETRIEVED POINTS FROM ONE VIEW ANGLE AND POSITIONS AND POSTURES FROM ANOTHER VIEW ANGLE

(75) Inventors: Koichiro Yamaguchi, Nagoya (JP); Naoya Chujo, Nagoya (JP); Kenichi Ohue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 499 days.

(21) Appl. No.: 12/602,572

(22) PCT Filed: May 15, 2008

(86) PCT No.: PCT/IB2008/001231
§ 371 (c)(1),
(2), (4) Date: Dec. 1, 2009

(87) PCT Pub. No.: WO2008/146114
PCT Pub. Date: Dec. 4, 2008

(65) Prior Publication Data
US 2010/0215220 A1    Aug. 26, 2010

(30) Foreign Application Priority Data
Jun. 1, 2007 (JP) .................................. 2007-147137

(51) Int. Cl.
G06K 9/36 (2006.01)
G06K 9/00 (2006.01)
(52) U.S. Cl. ........................................ 382/291; 382/106
(58) Field of Classification Search .................... 382/291
See application file for complete search history.

(56) References Cited

U.S. PATENT DOCUMENTS
4,825,393 A * 4/1989 Nishiya ........................ 702/152
(Continued)

FOREIGN PATENT DOCUMENTS
EP        0 436 213       7/1991
(Continued)

OTHER PUBLICATIONS

Yamaguchi et al., Estimation of the 3D Structure of Road Scenes from Monocular Images and Range Data, SICE Annual Conference, pp. 1465-1470, Sep. 17-20, 2007.*

(Continued)

*Primary Examiner* — David Zarka
(74) *Attorney, Agent, or Firm* — Oblon, Spivak, McClelland, Maier & Neustadt, L.L.P.

(57) ABSTRACT

While a view angle is switched between wide and narrow view angles, images with the wide view angle and images with the narrow view angle are alternately taken. Based on images taken with the narrow view angle, movements of corresponding points in images in correspondence between the narrow-angle images are detected. Based on the images taken with the wide view angle, a translational vector and a rotation matrix that represent changes in the position and posture between the wide-angle images are calculated. By linearly interpolating the translational vector and the rotation matrix between the wide-angle images, a translational vector and a rotation matrix that represent changes in the position and posture between the narrow-angle images are estimated. Based on movements of corresponding points in the images and the translational vector and the rotational matrix between the narrow-angle images, three-dimensional coordinates of the corresponding points on the measurement object are highly accurately measured.

15 Claims, 5 Drawing Sheets

U.S. PATENT DOCUMENTS

| | | | |
|---|---|---|---|
| 5,128,874 A | | 7/1992 | Bhanu et al. |
| 5,699,444 A * | | 12/1997 | Palm .......................... 382/106 |
| 6,661,913 B1 * | | 12/2003 | Zhang et al. .................. 382/154 |
| 6,990,253 B2 * | | 1/2006 | Takeda et al. ................. 382/276 |
| 7,132,933 B2 * | | 11/2006 | Nakai et al. ................... 340/435 |
| 7,792,330 B1 * | | 9/2010 | Lowder et al. ................ 382/106 |
| 2005/0117215 A1 * | | 6/2005 | Lange ........................... 359/462 |
| 2006/0268103 A1 * | | 11/2006 | Kweon et al. .................. 348/36 |

FOREIGN PATENT DOCUMENTS

| | | |
|---|---|---|
| JP | 7 181024 | 7/1995 |
| JP | 9 135380 | 5/1997 |
| JP | 2001 187553 | 7/2001 |

OTHER PUBLICATIONS

Pollefeys et al., Visual Modeling with a Hand-Held Camera, International Journal of Computer Vision, vol. 59, No. 3, pp. 207-232, 2004.*

Clady, Xavier et al., "Cars detection and tracking with a vision sensor", Intelligent Vehicles Symposium, 2003 Proceedings, IEEE, pp. 593-598, XP 010645945, (Jun. 9-11, 2003).

Yamaguchi, Koichiro et al., "Vehicle Ego-Motion Estimation and Moving Object Detection using a Monocular Camera", The 18$^{th}$ International Conference on Pattern Recognition (ICPR'06), IEEE Comput. Soc, XP 002507133, 4 pages, (Sep. 20-24, 2006).

Brattoli, M. et al., "A Vision-Based Off-Road Alert System", Intelligent Vehicles Symposium, Proceedings of the 1996 IEEE, XP 010209734, 6 pages, (Sep. 19-20, 1996).

Faugeras, Olivier "Three-Dimensional Computer Vision: A Geometric Viewpoint", The MIT Press, XP 002507137, pp. i-ix and 247-283, (2001).

Gregor, R. et al., "A Vision System for Autonomous Ground Vehicles with a Wide Range of Maneuvering Capabilities", Computer Vision Systems, Second International Workshop, ICVS 2001 Proceedings, XP 002507134, pp. 1-20, (Jul. 7-8, 2001).

Dickmanns, Ernst Dieter "The development of machine vision for road vehicles in the last decade", Intelligent Vehicle Symposium, IEEE 2002, XP 010635839, pp. 268-281, (Jun. 17-21, 2002).

Kuniyoshi, Yasuo et al., "A Foveated Wide Angle Lens for Active Vision", Proceedings of 1995 IEEE International Conference on Robotics and Automation, vol. 3, XP 002507136, pp. 2982-2988, (May 21-27, 1995).

* cited by examiner

DEVICE AND ASSOCIATED METHODOLOGY FOR MEASURING THREE-DIMENSIONAL POSITIONS BASED ON RETRIEVED POINTS FROM ONE VIEW ANGLE AND POSITIONS AND POSTURES FROM ANOTHER VIEW ANGLE

BACKGROUND OF THE INVENTION

1. Field of the Invention

The invention relates to a measurement device, a measurement method, a program, and a computer readable medium. In particular, the invention relates to a measurement device, measurement method, a program, and a computer readable medium for executing measuring a three-dimensional position of a measurement object.

2. Description of the Related Art

In the case where the measurement of a three-dimensional position of a body is to be performed by using a monocular camera mounted on a mobile unit, the three-dimensional position is calculated by estimating the motion of the monocular camera and detecting the movement of the body in images. The measurement accuracy regarding the three-dimensional position of the body is affected by both the accuracy of the motion estimation of the camera and the movement detection accuracy in the images.

An image pickup device having an automatic view angle control function of controlling the view angle so that the size of the body in images becomes constant is known (see Japanese Patent Application Publication No. 9-135380 (JP-A-9-135380)).

However, it is necessary to use images with a wide view angle to improve the accuracy of the motion estimation, while it is necessary to use narrow-view angle images zoomed in on the object body to improve the movement detection accuracy. In the technology described in Japanese Patent Application Publication No. 9-135380 (JP-A-9-135380), the view angle is controlled so that the size of the body in the images remains constant. Hence, the movement detection accuracy in the images can be improved even in the case where the body is remote. In that case, however, the view angle becomes narrow, so that the accuracy of the motion estimation degrades. Thus, the measurement accuracy of the three-dimensional position cannot be sufficiently improved.

SUMMARY OF THE INVENTION

The invention provides a measurement device, method, a program, and computer readable medium that are capable of executing highly accurately measuring the three-dimensional position of a measurement object.

A measurement device in accordance with a first aspect or example includes: an image pickup portion mounted in a mobile unit that outputs a plurality of images that are taken with a first view angle and that contain a measurement object and a plurality of images that are taken with a second view angle smaller than the first view angle and that contain the measurement object; a retrieval portion that retrieves, from at least two images taken with the second view angle by the image pickup portion, points that are each a feature point on the measurement object and that are in correspondence between the at least two images; a position and posture calculation portion that, on a basis of the plurality of images taken with the first view angle by the image pickup portion, calculates a relative relationship of a position and a posture of the image pickup portion occurring at each of times of image-taking of the plurality of images; a position and posture estimation portion that, on a basis of relative relationships of the positions and the postures calculated by the position and posture calculation portion, estimates the relative relationships of the positions and the postures of the image pickup portion occurring at times of the image-taking of the at least two images with the second view angle; and a position measurement portion that measures a three-dimensional position of the points retrieved by the retrieval portion, on a basis of the retrieved points and the relative relationships of the positions and the postures estimated by the position and posture estimation portion.

A program or computer readable medium in accordance with a second aspect or example of the invention is a program or computer readable medium including computer executable code for causing a computer to: retrieve, from at least two images that an image pickup portion mounted in a mobile unit that outputs a plurality of images that are taken with a first view angle and that contain a measurement object and a plurality of images that are taken with a second view angle smaller than the first view angle and that contain the measurement object has taken with the second view angle, points that are each a feature point on the measurement object and that are in correspondence between the at least two images; to calculate, on a basis of the plurality of images taken with the first view angle by the image pickup portion, a relative relationship of a position and a posture of the image pickup portion occurring at each of times of image-taking of the plurality of images; to estimate, on a basis of the relative relationships of the positions and the postures calculated, the relative relationship of the position and the posture of the image pickup portion occurring at times of image-taking of the at least two images with the second view angle; and to measure a three-dimensional position of the points retrieved by the retrieval, on a basis of the retrieved points and the relative relationship of the position and the posture estimated.

A measurement method in accordance with a third aspect or example of the invention that includes an image pickup portion mounted in a mobile unit includes: outputting a plurality of images that are taken by the image pick up portion with a first view angle and that contain a measurement object and outputting a plurality of images that are taken by the image pickup portion with a second view angle smaller than the first view angle and that contain the measurement object; retrieving, from at least two images taken with the second view angle by the image pickup portion, points that are each a feature point on the measurement object and that are in correspondence between the at least two images; calculating, on a basis of the plurality of images taken with the first view angle by the image pickup portion, a relative relationship of a position and a posture of the image pickup portion occurring at each of times of image-taking of the plurality of images; estimating, on a basis of the relative relationships of the positions and the postures calculated, the relative relationship of the position and the posture of the image pickup portion occurring at the times of image-taking of the at least two images with the second view angle; and measuring a three-dimensional position of the points retrieved, on a basis of the retrieved points and the relative relationship between the position and the posture estimated.

According to the foregoing first, second and third aspects or examples, corresponding points of a feature point on a measurement object are retrieved from images taken with the relatively narrow second view angle, and relative relationships of the position and the posture of the image pickup portion are estimated from images taken with the relatively wide first view angle, so that the accuracy of estimation of the motion of the image pickup portion and the detection accuracy for the corresponding points on the measurement object can be improved. Therefore, the three-dimensional coordinates of the measurement object can be highly accurately measured.

In the foregoing aspects or examples, the image pickup portion may serially take images of the measurement object while switching a view angle from one of the first view angle and the second view angle smaller than the first view angle to another one of the first view angle and the second view angle. According to this construction, both images taken with the relatively wide first view angle and images taken with the relatively narrow second view angle can be obtained via one image pickup portion.

Furthermore, the image pickup portion may alternately take an image with the first view angle and an image with the second view angle.

In the foregoing aspects or examples, the position and posture calculation portion may retrieve, from two images taken with the first view angle by the image pickup portion, at least eight sets of points that are feature points and that are in correspondence between the two images, and may calculate the relative relationship of the position and the posture of the image pickup portion at each of the times of the image-taking of the two images on a basis of the at least eight sets of points retrieved. Furthermore, the relative relationship of the position and the posture may include a displacement amount and a rotation amount. Therefore, the relative relationship of the position and the posture can be calculated with good accuracy on the basis of the at least eight sets of points that are in correspondence between the two images.

In the foregoing aspects or examples, each set of the at least eight sets of points may be different in movement from the other at least seven sets of points.

Furthermore, a three-dimensional position is to be measured with regard to a point that is not in any image taken with the second view angle but that is in images taken with the first view angle, and the position measurement portion may retrieve, from the two images taken with the first view angle from which the points that are in correspondence have been retrieved by the position and posture calculation portion, points that are feature points and that are in correspondence between the two images, and may measure the three-dimensional positions of the retrieved points on a basis of the retrieved points and the relative relationships between the positions and the postures calculated by the position and posture calculation portion. According to this construction, the three-dimensional positions of feature points that appear only in images with the first view angle can also be measured. Therefore, the three-dimensional position of the measurement object can be measured in a wide-angle visual field.

In the foregoing aspects or examples, the relative relationships of the position and the posture may include a displacement amount in directions of three axis directions and a rotation amount with reference to three axes.

In the foregoing aspects or examples, the retrieval portion may retrieve, from a first image taken with the second view angle by the image pickup portion and a second image taken with the second view angle by the image pickup portion after the first image is taken, points that are each a feature point on the measurement object and that are in correspondence between the first image and the second image. The position and posture calculation portion may calculate a first displacement amount in three axis directions and a first rotation amount with reference to three axes which represent relative relationships between the position and the posture of the image pickup portion occurring when a third image is taken with the first view angle by the image pickup portion before the first image is taken and the position and the posture of the image pickup portion occurring when a fourth image is taken with the first view angle by the image pickup portion between the image-taking of the first image and the image-taking of the second image. The position and posture calculation portion may calculate a second displacement amount in the three axis directions and a second rotation amount with reference to the three axes that represents relative relationships between the position and the posture of the image pickup portion occurring when the fourth image is taken and the position and the posture of the image pickup portion occurring when a fifth image is taken with the first view angle by the image pickup portion after the second image is taken. The position and posture estimation portion may estimate a third displacement amount a third rotation amount that represent the relative relationships between the position and the posture of the image pick up portion occurring when the first image is taken and the position and the posture of the image pickup portion occurring when the second image is taken, on a basis of the first displacement amount, the second displacement amount, the first rotation amount, and the second rotation amount that are calculated by the position and posture calculation portion. According to this construction, the displacement amount and the rotation amount of the image pickup portion occurring when an image with the narrow second view angle is taken can be estimated with good accuracy on the basis of the displacement amount and the rotation amount calculated from the image with the wider first view angle taken before and after the image with the narrow second view angle is taken.

The position and posture calculation portion in the foregoing construction or example may retrieve, from the third image and the fourth image, at least eight sets of points that are feature points and that are in correspondence between the third image and the fourth image, and may calculate, on a basis of the retrieved at least eight sets of points, the first displacement amount and the first rotation amount that represent the relative relationships between the positions and the postures of the image pickup portion occurring at the times of image-taking of the third image and the fourth image, and may retrieve, from the fourth image and the fifth image, at least eight sets of points that are feature points and that are in correspondence between the fourth image and the fifth image, and may calculate, on a basis of the retrieved at least eight sets of points, the second displacement amount and the second rotation amount that represent the relative relationships between the positions and the postures of the image pickup portion occurring at the times of the image-taking of the fourth image and the fifth image. According to the foregoing construction, the displacement amount and the rotation amount can be calculated with good accuracy on the basis of at least eight sets of points that are in correspondence between the third image and the fourth image and at least eight sets of points that are in correspondence between the fourth image and the fifth image.

According to the foregoing construction or example, the position measurement portion may serially measure the three-dimensional position. And the measurement device may further include a view angle determination portion that determines the second view angle so that the greater a distance of the three-dimensional position previously measured from the mobile unit, the smaller the view angle. According to the foregoing construction, the detection accuracy for corresponding points on a measurement object that are retrieved from images taken with the narrow second view angle can be improved.

In the foregoing aspect or example, the measurement device may further include a velocity measurement portion that measures a traveling speed of the mobile unit, and an image pickup control portion that controls the image pickup portion so that the lower the traveling speed measured by the velocity measurement portion, the longer the image-taking interval of the image pickup portion. According to the construction, the movement of corresponding points retrieved from images are suitably made large. Therefore, the accuracy of the motion estimation regarding the image pickup portion can be improved.

In the foregoing construction, the position measurement portion may serially measure the three-dimensional position. And the measurement device may further include an image pickup control portion that controls the image pickup portion so that the greater a distance of the three-dimensional position previously measured from the mobile unit, the longer the image-taking interval of the image pickup portion. According to this construction, the movements of corresponding points retrieved from images are suitably made large. Therefore, the accuracy of the motion estimation regarding the image pickup portion can be improved.

As described above, according to the measurement device, the measurement method, the program and the computer readable medium of the invention, corresponding points of a feature point on a measurement object are retrieved from images taken with the narrow second view angle, and relative relationships of the position and the posture of the image pickup portion are estimated from images taken with the wide first view angle, so that the accuracy of estimation of the motion of the image pickup portion and the detection accuracy for the corresponding points on the measurement object can be improved. Therefore, the three-dimensional coordinates of the measurement object can be highly accurately measured.

As should be apparent, the invention can provide a number of advantageous features and benefits. It is to be understood that, in practicing the invention, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The foregoing and further objects, features and advantages of the invention will become apparent from the following description of examples of embodiments with reference to the accompanying drawings, wherein like numerals are used to represent like elements and wherein.

DETAILED DESCRIPTION OF EMBODIMENTS

Embodiments or examples of the invention will be described hereinafter in detail with reference to the drawings.

Figure 1:
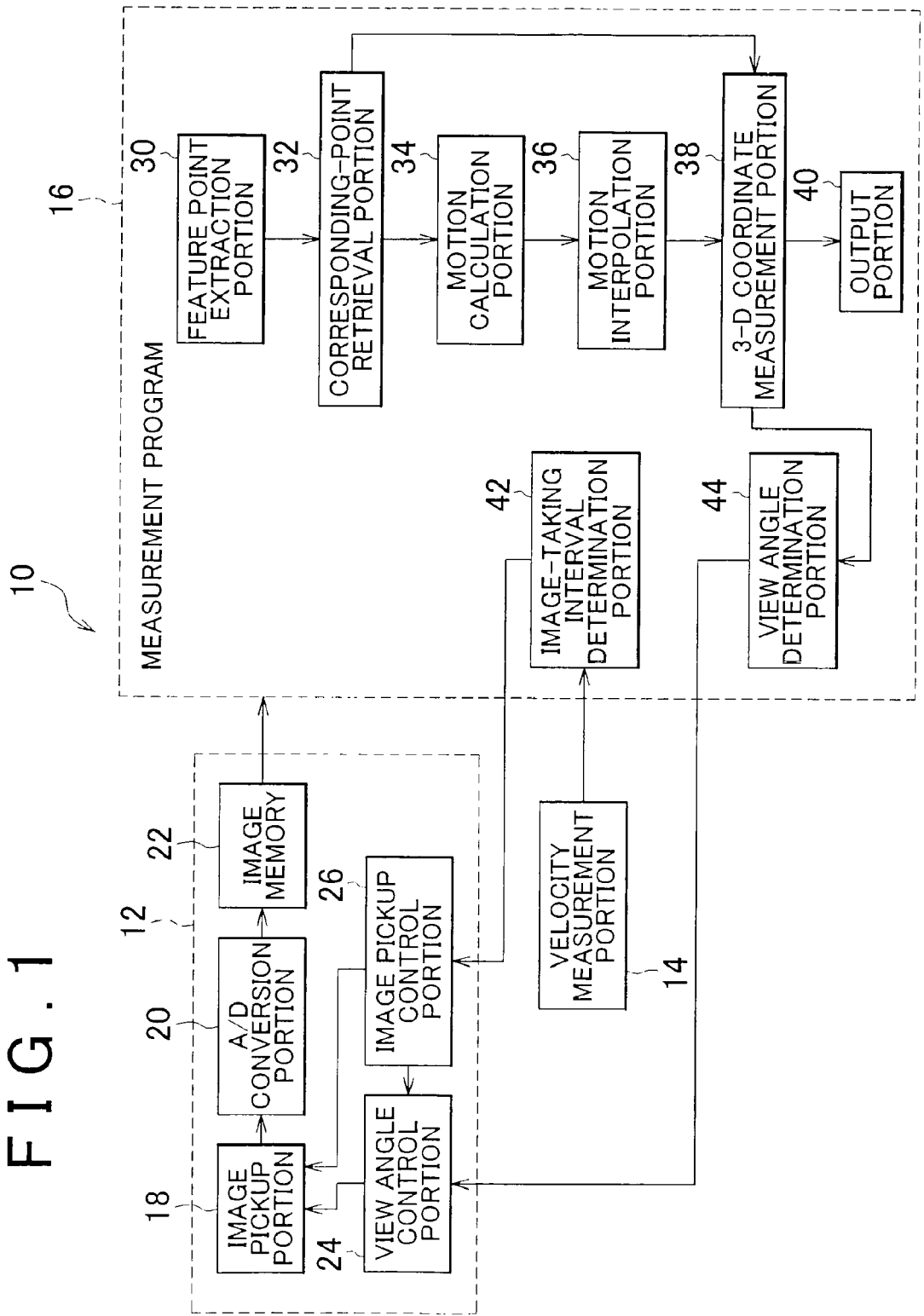
FIG. 1 is a block diagram showing a measurement device in accordance with a first embodiment of the invention.

As shown in FIG. 1, a measurement device 10 in accordance with an embodiment or example includes: an image pickup device 12 that is mounted on a vehicle (not shown) and that generates images by taking images of a measurement object while changing the view angle; a velocity measurement portion 14 that measures the running velocity of the vehicle; and a computer 16 storing a measurement program for realizing a measurement process routine of measuring the three-dimensional coordinates of the measurement object on the basis of the images obtained from the image pickup device 12. The measurement program includes computer executable code and can be stored on or in a computer readable medium, such as an optical disk, magnetic disk, ROM, RAM, etc.

The image pickup device 12 includes: an image pickup portion 18 constructed of a monocular camera which takes images of a measurement object and which generates image signals of the images; an A/D conversion portion 20 that A/D converts the image signals generated by the image pickup portion 18; an image memory 22 for temporarily storing the A/D converted image signals; a view angle control portion 24 that controls the view angle by changing the zoom magnification ratio; and an image pickup control portion 26 that controls the image pickup timing based on the image-taking interval, and the timing of the changing of the view angle performed by the view angle control portion 24 according to the image pickup timing.

The measurement program stored in the computer 16 includes computer executable program code to operate as: a feature point extraction portion 30 that extracts, from each of images obtained from the image pickup device 12, a plurality of feature points that are easily traceable in images; a corresponding-point retrieval portion 32 that retrieves, from the feature points of two of the images that are obtained from the feature point extraction portion 30, corresponding points that are in correspondence between the two images; a motion calculation portion 34 that, using as inputs the image coordinates of the images at the corresponding points obtained by the corresponding-point retrieval portion 32, calculates the change from the position and posture of the image pickup device 12 occurring when the image pickup device 12 took one of the images from which the corresponding points have been retrieved, which serves as a reference position and posture, to the position and posture of the image pickup device 12 occurring when the image pickup device 12 took the other one of the images from which the corresponding points have been retrieved (i.e., calculates a relative relationship in position and posture therebetween), as displacement amounts of the image pickup device 12 in X, Y and Z-axes of motion and rotation amounts with reference to the X, Y and Z-axes; motion interpolation portion 36 that interpolates the displacement amounts and the rotation amounts of the image pickup device 12 occurring from the time when the image pickup device 12 took the one of the images from which the corresponding points have been retrieved to the time when the image pickup device 12 took the other one of the images from which the corresponding points have been retrieved, through linear interpolation, on the basis of the displacement amounts and the rotation amounts calculated by the motion calculation portion 34; a three-dimensional coordinates measurement portion 38 that measures the three-dimensional coordinates of a measurement object; and an output portion 40 that outputs a result from the three-dimensional coordinates measurement portion 38.

The measurement program further includes an image-taking interval determination portion 42 that determines the image-taking interval of the image pickup device 12 on the basis of the running velocity measured by the velocity measurement portion 14, and a view angle determination portion 44 that determines the view angle of the image pickup device 12 on the basis of the three-dimensional coordinates of the measurement object that were previously measured by the three-dimensional coordinates measurement portion 38.

Figure 2:
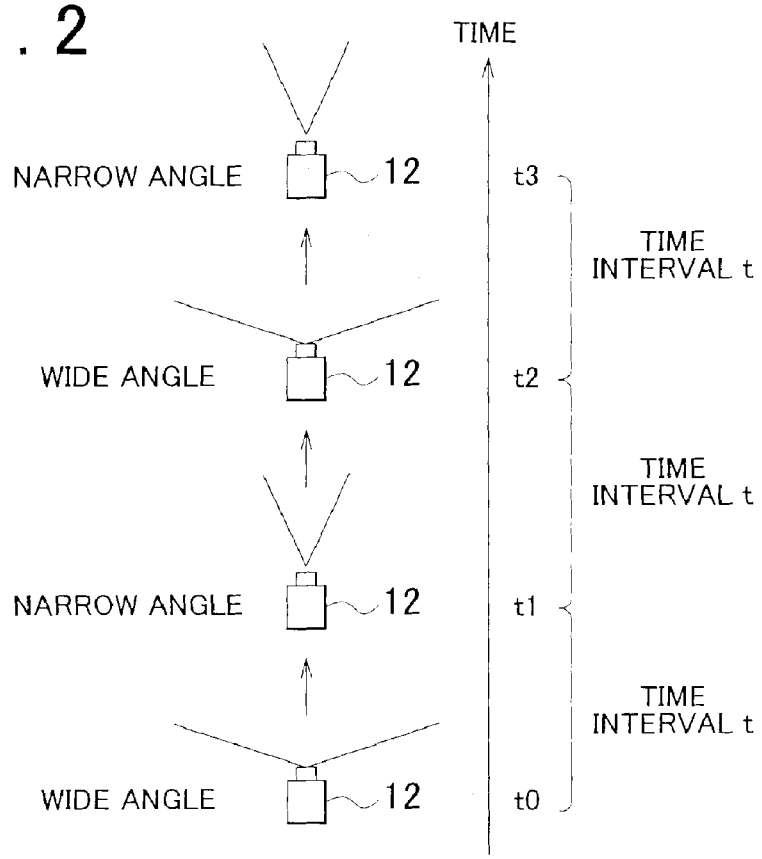
FIG. 2 is a conceptual diagram showing a state where images are serially taken while the view angle is being switched between the narrow view angle and the wide view angle in the first embodiment of the invention.

The image pickup device 12, as shown in FIG. 2, alternately takes an image with a wide view angle and an image with a narrow view angle by switching the view angle between the wide view angle and the narrow view angle via the view angle control portion 24. Also, by the image pickup control portion 26, the image-taking interval time t is controlled, so that images are taken serially at intervals of the image-taking interval time t.

The image-taking interval determination portion 42 of the computer 16 determines, as the image-taking interval, a time such that the average or maximum value of predicted values of the movement amounts in images of the corresponding point between the image with the wide view angle becomes greater than or equal to a threshold value. The determination of an image-taking interval, for example, when a wide-angle image is taken at time $t_2$ in FIG. 2, will be considered below.

At this time, the running velocity measured by the velocity measurement portion 14 is utilized. Let it be assumed that the three-dimensional displacement amount of the vehicle during an amount of time 2t from time $t_0$ to time $t_2$ (see FIG. 2) estimated from the velocity measurement portion 14 is ($m_x$, $m_y$, $m_z$). The calibration matrix K of the image pickup portion 18 used when a wide-angle image is taken is defined by the following equation (1):

$$K = \begin{bmatrix} f_x & 0 & c_u \\ 0 & f_y & c_v \\ 0 & 0 & 1 \end{bmatrix} \tag{1}$$

In the above equation, $f_x$ is the focal length of the image pickup portion 18 in the X-direction, $f_y$ is the focal length of the image pickup portion 18 in the Y-direction, and ($c_u$, $c_v$) is the image center. Incidentally, it is defined that the image coordinates in images be expressed by the coordinate u in a U-direction corresponding to the X-direction and the coordinate v in a V-direction corresponding to the Y-direction.

Then, if the image coordinates in the image at time $t_2$ of the corresponding point measured as (x, y, z) in the three-dimensional coordinates at time $t_0$ is expressed using the following equation (2), the image coordinates are calculated by using the following equation (3).

$$(\tilde{u}', \tilde{v}') \tag{2}$$

$$\tilde{u}' = \hat{u}'/\hat{w}', \tilde{v}' = \hat{v}'/\hat{w}' \tag{3}$$

where $$\begin{pmatrix} \hat{u}' \\ \hat{v}' \\ \hat{w}' \end{pmatrix} = K \begin{pmatrix} 1 & 0 & 0 & 0 \\ 0 & 1 & 0 & 0 \\ 0 & 0 & 1 & 0 \end{pmatrix} \begin{pmatrix} x - m_s \\ y - m_y \\ z - m_z \\ 1 \end{pmatrix} \tag{4}$$

If the image coordinates of the corresponding point at time $t_0$ are (u, v), the predicted value of the movement amount is expressed by the following equation (5):

$$\sqrt{(\tilde{u}'-u)^2 + (\tilde{v}'-v)^2} \tag{5}$$

Hence, the three-dimensional displacement amount ($m_x$, $m_y$, $m_z$) is found so that the average or maximum value of the predicted value of the movement amount expressed by the equation (5) becomes greater than or equal to the threshold value, and then the image-taking interval time t is determined from the three-dimensional displacement amount and the running velocity obtained from the velocity measurement portion 14. Therefore, the image-taking interval time t is determined such that the lower the running velocity of the vehicle, the longer the image-taking interval becomes.

Also, the view angle determination portion 44 determines the narrow view angle such that the view angle becomes narrower the greater the distance of the three-dimensional coordinates from the vehicle, on the basis of the distribution of the three-dimensional coordinates of the corresponding points obtained via the three-dimensional coordinates measurement portion 38 at the previous measurement timing. For example, when the image-taking interval time t is determined by the foregoing method, a focal length is set such that the average or maximum value of the predicted value of the movement amount of the corresponding point on the measurement object in an image present adjacent to the front of the vehicle becomes greater than or equal to the threshold value. Then, the narrow view angle is determined on the basis of the set focal length. In addition, as for the wide view angle, it suffices to determine the angle as a maximum view angle that can be set by the image pickup portion 18.

The feature point extraction portion 30 extracts feature points individually from two images taken with the same view angle at different times which are obtained from the image pickup device 12. The feature point refers to a point that is distinguishable from surrounding points, and that allows a correspondence relationship between different images to be easily found. The feature point is automatically extracted through the use of a method (e.g., Harris operator, or the like) in which pixels with two-dimensionally enlarging values of the gradient of the contrasting density are detected. In the method using the Harris operator, feature points are extracted as described below. Firstly, the brightness of a point (u, v) in an image is expressed as I(u, v), the matrix M is calculated as in the equation (6).

$$M = \begin{pmatrix} G_\sigma(I_u^2) & G_\sigma(I_u \cdot I_v) \\ G_\sigma(I_u \cdot I_v) & G_\sigma(I_v^2) \end{pmatrix} \tag{6}$$

In the equation (6), $I_u$, $I_v$ represent the differentials in the horizontal direction and the vertical direction, respectively, and $G_\sigma$ represents the smoothing by the Gauss distribution with a standard deviation σ.

Then, using the eigenvalues λ1, λ2 of the matrix M calculated in the equation (6), the corner strength is calculated as in the following equation (7).

$$\lambda_1 \cdot \lambda_2 - k \cdot (\lambda_1 + \lambda_2)^2 \tag{7}$$

In the equation, k is a preset constant, and is generally a value of 0.04 to 0.06. In the method using the Harris operator, a point where the corner strength is greater than the threshold value and is a maximum is selected, and the selected point is extracted as a feature point.

With regard to the feature points extracted from each of the two images by the feature point extraction portion 30, the corresponding-point retrieval portion 32 associates the feature points between the two images to retrieve corresponding points that are in correspondence between the two images. In the association of the feature points between the two images, small regions are set around the feature points, and a set of feature points around which small regions have similar brightness distributions are selected, and the set of the selected points are determined as corresponding points. For the determination as to whether two feature points are similar to each other, it is appropriate to use a value, such as an SSD (sum of squared differences), or the like.

With regard to the feature points extracted from each of two wide-angle images by the feature point extraction portion 30, the corresponding-point retrieval portion 32 retrieves, by way of example, at least eight sets of corresponding points that are in correspondence between the two wide-angle images.

Figure 3:
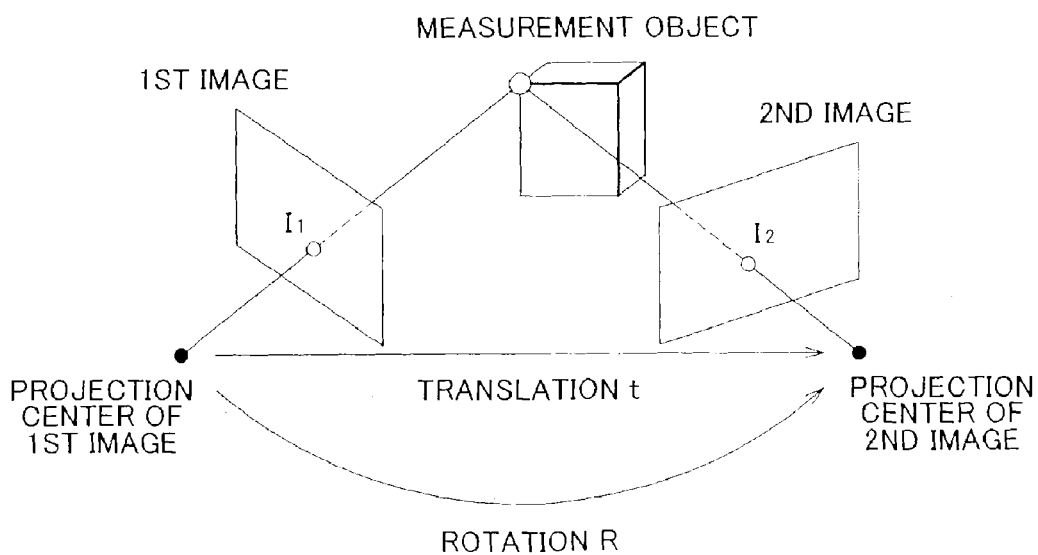
FIG. 3 is a diagram for illustrating a translational vector and a rotation matrix that represent changes in the position and posture in the first embodiment of the invention.

From the image coordinates of the at least eight sets of corresponding points in the two wide-angle images obtained from the corresponding-point retrieval portion 32, the motion calculation portion 34 calculates changes in the position and posture of the image pickup device 12 between the times of the image-taking of the two wide-angle images (the displacement amounts in the directions of the X, Y and Z-axes and the rotation amounts with reference to the X, Y and Z-axes). As shown in FIG. 3, the change in the position and posture is a motion composed of six elements of a rotation matrix R from the first image to the second image (the rotation amount with reference to the X-axis, the rotation amount with reference to the Y-axis, and the rotation amount with reference to the Z-axis) and a translational vector (the displacement amount $t_x$ in the X-axis direction, the displacement amount $t_y$ in the Y-axis direction, and the displacement amount $t_z$ in the Z-axis direction). Incidentally, the elements of the rotation matrix R and the translational vector t are physical quantities that represent the conversion of the image coordinates between the two images.

The calculation methods for the rotation matrix R from the first image to the second image and for the translational vector t will be described. With regard to the image coordinates $I_i$ of n number of corresponding points in the first image and the image coordinates $I_i'$ of n number of corresponding points in the second image ($n \geq 8$), there exists a 3×3 matrix F that satisfies the following equation (8) if the corresponding points are correct and do not have errors.

$$I_i'^T F I_i = 0 \qquad (8)$$

In the equation, $I_i = (u_i, v_i, 1)^T$, $I_i' = (u_i', v_i', 1)^T$, and the image coordinates of the point in the second image that corresponds to the point of the image coordinates $(u_i, v_i)$ in the first image is $(u_i', v_i')$.

It is to be noted herein that the matrix F that satisfies the equation (8) has a constant-times indefiniteness. Specifically, if $F_s$ satisfies the equation (8), $\alpha F_s$ also satisfies the equation (8) (where $\alpha$ is a real number). Hence, the matrix F can be expressed as in the following equation (9):

$$F = \begin{bmatrix} f_{11} & f_{12} & f_{13} \\ f_{21} & f_{22} & f_{23} \\ f_{31} & f_{32} & 1 \end{bmatrix} \qquad (9)$$

From the equations (8) and (9), the following equation (10) holds.

$$u_i u' f_{11} + u_i v' f_{21} + u_i f_{31} + v_i u' f_{12} v_i v' f_{22} + v_i f_{32} + u' f_{13} + v' f_{23} + 1 = 0 \qquad (10)$$

It is to be noted herein that if there are eight or more corresponding points $I_i$, $I_i'$, at least eight equations can be obtained from the equation (10), so that the eight variables $f_{11}$ to $f_{32}$ can be found. Incidentally, since the obtained eight equations need to be independent from each other, and so that stable calculation can be performed even when an error is contained, it is preferable that a set of feature points that are moving as differently from the other sets of the corresponding points as possible be retrieved.

If the matrix F can be calculated as described above or the calibration matrix K of the image pickup portion 18 is known, the rotation matrix R and the translational vector t can be calculated from the following equation (11) and the following equation (12).

$$F = K^{-T}[t]_x R K^{-1} \qquad (11)$$

$$[t]_x = \begin{bmatrix} 0 & -t_z & t_y \\ t_z & 0 & -t_x \\ -t_y & t_x & 0 \end{bmatrix}, t = (t_x, t_y, t_z) \qquad (12)$$

With regard to the images taken during a period between the times of the image-taking of the two images during which a change in the position and posture is calculated by the motion calculation portion 34, the motion interpolation portion 36 finds the change in the position and posture of the image pickup device 12 (the rotation matrix and the translational vector) by linearly interpolating the change in the position and posture obtained via the motion calculation portion 34. For example, by linearly interpolating the translational vector and the rotation amount represented by the rotation matrix calculated with respect to the wide-angle images of time $t_0$ and time $t_2$ in FIG. 2, the translational vector and the rotation amount represented by the rotation matrix of the narrow-angle image of time $t_1$ with reference to the wide-angle image of time $t_0$ are calculated. Also, by linearly interpolating the translational vector and the rotation matrix calculated with respect to the wide-angle images at times $t_2$ and $t_4$, the translational vector and the rotation matrix of the narrow-angle image of time $t_3$ with reference to the wide-angle image of time $t_2$ are calculated. Then, on the basis of the rotation matrices and the translational vectors of the narrow-angle images at times $t_1$, $t_3$, the rotation matrix and the translational vector between the narrow-angle image of time $t_1$ and the narrow-angle image of time $t_3$ are calculated.

The three-dimensional coordinates measurement portion 38 calculates the three-dimensional coordinates of the corresponding point on the measurement object, by using the image coordinates of the corresponding points between the two narrow-angle images obtained from the corresponding-point retrieval portion 32, and the rotation matrix and the translational vector between the two narrow-angle images obtained from the motion interpolation portion 36. The three-dimensional coordinates of the corresponding points can be calculated by the following method.

Firstly, in the case where the image coordinates of the corresponding points of the two narrow-angle images are (u, v) and (u', v'), and the rotation matrix between the narrow-angle images is R, and the translational vector therebetween is t, and the calibration matrix of the image pickup portion 18 is K, matrices P, P' as in the following equations (13) and (14) are defined.

$$P = K \begin{pmatrix} 1 & 0 & 0 & 0 \\ 0 & 1 & 0 & 0 \\ 0 & 0 & 1 & 0 \end{pmatrix} \quad (13)$$

$$P' = K \begin{pmatrix} r_{11} & r_{12} & r_{13} & t_x \\ r_{21} & r_{22} & r_{23} & t_y \\ r_{31} & r_{32} & r_{33} & t_z \end{pmatrix} \quad (14)$$

where $$R = \begin{pmatrix} r_{11} & r_{12} & r_{13} \\ r_{21} & r_{22} & r_{23} \\ r_{31} & r_{32} & r_{33} \end{pmatrix}, t = (t_x, t_y, t_z)^T \quad (15)$$

Then, if $p^i$, $p'^i$ are the vectors of the first line in the matrices P, P', the three-dimensional coordinates $X=(x, y, z, 1)^T$ of the corresponding point can be found as a solution to the equation (15).

$$AX = 0 \quad (15)$$

where $$A = \begin{bmatrix} u \cdot p^{3T} - p^{1T} \\ v \cdot p^{3T} - p^{2T} \\ u' \cdot p'^{3T} - p'^{1T} \\ v' \cdot p'^{3T} - p'^{2T} \end{bmatrix} \quad (16)$$

Next, an operation of the measurement device 10 in accordance with the embodiment or example will be described. The following description will be made in conjunction with an example in which while a vehicle equipped with the measurement device 10 is traveling, the three-dimensional coordinates of a measurement object is measured.

Figure 4:
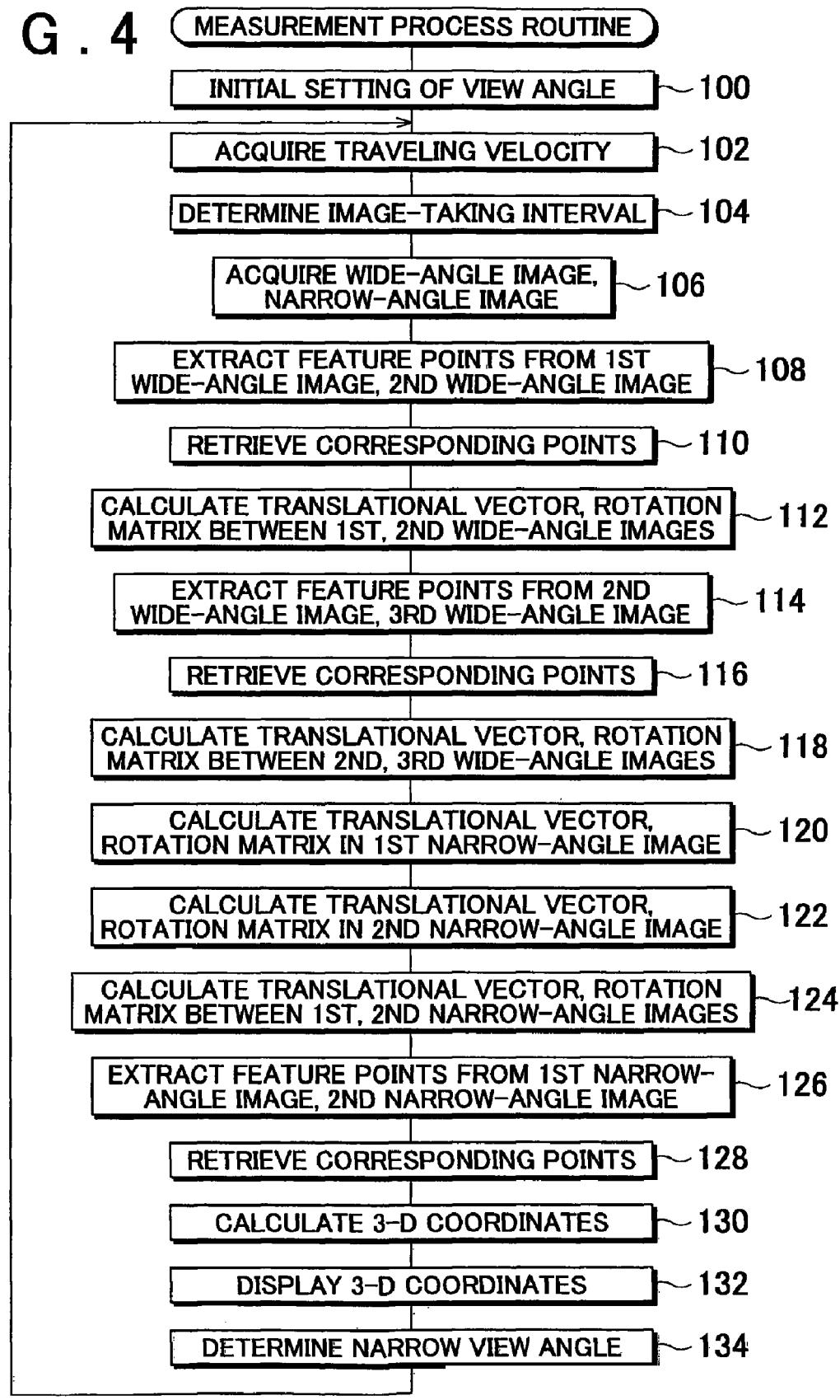
FIG. 4 is a flowchart showing a measurement process routine in the measurement device in accordance with the first embodiment of the invention.

Firstly, when the image pickup device 12 is directed toward a measurement object and the image pickup device 12 starts the continuous image-taking of the measurement object, the computer 16 executes a measurement process routine for measuring the three-dimensional coordinates of the measurement object as shown in FIG. 4. The measurement process routine of FIG. 4 can be implemented as computer executable code stored in or on a computer readable medium such as an optical disk, magnetic disk, ROM, RAM, etc.

Firstly in step 100, as an initial setting, the computer 16 sets the wide view angle and the narrow view angle at predetermined maximum view angles of the image pickup portion 18. Subsequently in step 102, the running velocity of the vehicle measured by the velocity' measurement portion 14 is acquired. Then, in step 104, the image-taking interval time t is determined on the basis of the running velocity acquired in step 102, and the image-taking interval of the image pickup device 12 is controlled so that the continual image taking is performed with the determined image-taking interval time t. Therefore, the image pickup device 12, switching the view angle between the set wide view angle and the set narrow view angle, alternately takes an image with the wide view angle and an image with the narrow view angle with the set image-taking interval time t.

Subsequently in step 106, the computer 16 sequentially acquires from the image pickup device 12 the first wide-angle image with the wide view angle (e.g., image-taking time $t_0$), the first narrow-angle image with the narrow view angle (image-taking time $t_1=t_0+t$), the second wide-angle image with the wide view angle (image-taking time $t_2=t_0+2t$), the second narrow-angle image with the narrow view angle (image-taking time $t_3=t_0+3t$), and the third wide-angle image with the wide view angle (image-taking time $t_4=t_0+4t$).

Then in step 108, the computer 16 extracts feature points from each of the first wide-angle image and the second wide-angle image, and in step 110, retrieves at least eight sets of corresponding points that are in correspondence between the first wide-angle image and the second wide-angle image from the feature points extracted in step 108. Then, in step 112, on the basis of the image coordinates of the at least eight sets of the corresponding points retrieved in step 110, the computer 16 calculates the translational vector and the rotation matrix that represent the change in the position and posture of the image pickup device 12 occurring when the second wide-angle image was taken, with reference to the position/posture of the image pickup device 12 occurring when the first wide-angle image was taken.

Subsequently in step 114, the computer 16 extracts a plurality of feature points from each of the second wide-angle image and the third wide-angle image, and in step 116, retrieves at least eight sets of corresponding points that are in correspondence between the second wide-angle image and the third wide-angle image from the feature points extracted in step 114. Then, in step 118, on the basis of the image coordinates of the at least eight corresponding points retrieved in step 116, the computer 16 calculates the translational vector and the rotation matrix that represent the change in the position/posture position and posture of the image pickup device 12 occurring when the third wide-angle image was taken, with reference to the position and posture of the image pickup device 12 occurring when the second wide-angle image was taken.

Then, in step 120, the computer 16 interpolates the translational vector and the rotation matrix calculated in step 112 to calculate the rotation matrix and the translational vector that represent changes in the position and posture of the image pickup device 12 occurring when the first narrow-angle image was taken, with reference to the position and posture of the image pickup device 12 occurring when the first wide-angle image was taken. Subsequently in step 122, the computer 16 interpolates the translational vector and the rotation matrix calculated in step 118 to calculate the translational vector and the rotation matrix that represent changes in the position and posture of the image pickup device 12 occurring when the second narrow-angle image was taken, with reference to the position and posture of the image pickup device 12 occurring when the second wide-angle image taken.

Then, in step 124, on the basis of the translational vector and the rotation matrix calculated in steps 120, 122, the computer 16 calculates the translational vector and the rotation matrix that represent changes in the position and posture of the image pickup device 12 occurring when the second narrow-angle image was taken, with reference to the position and posture of the image pickup device 12 occurring when the first narrow-angle image was taken.

Then, in step 126, the computer 16 extracts feature points from each of the first narrow-angle image and the second narrow-angle image. In step 128, from the feature points extracted in step 126, the computer 16 retrieves at least one set of corresponding points that are in correspondence between the first narrow-angle image and the second narrow-angle image.

Subsequently in step 130, on the basis of the translational vector and the rotation matrix between the first narrow-angle image and the second narrow-angle image calculated in step 124 and the image coordinates of the corresponding points in the first narrow-angle image and the second narrow-angle image retrieved in step 128, the computer 16 calculates the three-dimensional coordinates of the feature points on the measurement object that the corresponding point indicates. In step 132, the calculated three-dimensional coordinates of the feature points on the calculated measured object are displayed in the display of the computer 16.

Then, in step 134, on the basis of the three-dimensional coordinates calculated in step 134, the narrow view angle is determined, and the narrow view angle of the image pickup device 12 is controlled so as to become equal to the determined narrow view angle. Then, the process goes back to step 102, in which the three-dimensional coordinates of the feature points on the measurement object at the next measurement timing are measured on the basis of an image with the set wide view angle image and an image with the newly determined narrow view angle.

As described above, according to the measurement device in accordance with the first embodiment or example, on the basis of the two images taken with the narrow view angle, corresponding points are retrieved from the feature points on the measurement object. Then, from a plurality of images taken with the wide view angle, the translational vector and the rotation matrix that represent the changes in the position and posture of the image pickup device at the times of the image-taking of the two narrow-angle images are estimated. Therefore, the accuracy of estimation of the motion of the image pickup device and the detection accuracy for the corresponding points on the measurement object can be improved. Hence, the three-dimensional coordinates of the measurement object can be highly accurately measured.

Furthermore, the measurement device switches the view angle between the wide angle and the narrow angle while taking images. Therefore, the three-dimensional coordinates of the measurement object can be highly accurately measured from a result of the highly accurate motion estimation based on a plurality of corresponding points retrieved from the wide ranges of areas of the wide-angle images and a result of the highly accurate detection of the movements of feature points in the narrow-angle images.

Furthermore, since the view angle of the image pickup portion is switched between the wide angle and the narrow angle, the images taken with the wide view angle and the images taken with the narrow view angle can be obtained via one image pickup portion.

Furthermore, on the basis of at least eight sets of corresponding points that are in correspondence between two wide-angle images, the translational vector and the rotation matrix can each be calculated with good accuracy.

On the basis of the translational vector and the rotation matrix calculated from the two images with the wide view angle taken before and after an image with the narrow view angle is taken, the translational vector and the rotation matrix of the image pickup device at the time of the image-taking of the narrow view angle can be estimated with good accuracy.

Furthermore, since the narrow view angle is determined so as to be smaller the greater the distance from the vehicle of the three-dimensional coordinates of the previously measured measurement object, it is possible to improve the detection accuracy of the corresponding points on the measurement object that are retrieved from images taken with the narrow view angle.

Furthermore, since the image-taking interval between the images for use for the motion estimation and the movement detection is determined so as to become longer the lower the running velocity of the vehicle becomes, the movements of corresponding points retrieved from the images are suitably made large. Therefore, it is possible to improve the accuracy of the motion estimation regarding the image pickup portion, and the accuracy of the movement detection.

Furthermore, using serial images taken by the monocular camera, the three-dimensional coordinates of a measurement object can be highly accurately measured.

Although in the foregoing embodiment, points that are in correspondence between two images are retrieved from a plurality of feature points extracted from the two images, it is also permissible that feature points be extracted from one of two images, and that corresponding points that correspond to any of the extracted feature points be retrieved from the other one, of the images.

Furthermore, although the case where the measurement of three-dimensional coordinates is performed only for the corresponding points retrieved from narrow-angle images is described above as an example in conjunction with the embodiment, it is also permissible that the measurement of three-dimensional coordinates be also performed for the corresponding points that are in a range not covered by the narrow-angle images but that appear in wide-angle images. In that case, it suffices that from the feature points in a first wide-angle image and a second wide-angle image from which corresponding points have been retrieved to calculate the translational vector and the rotation matrix, corresponding points that are in correspondence between the first wide-angle image and the second wide-angle image be retrieved, and that the three-dimensional coordinates of a feature point on the measurement object indicated by the corresponding points be calculated on the basis of the image coordinates of the retrieved corresponding points in the first wide-angle image and the second wide-angle image, and the translational vector and the rotation matrix be calculated between the first wide-angle image and the second wide-angle image. Therefore, while the distance accuracy of a measurement object present in central portions in images (substantially in the frontal direction from the mobile unit) is heightened by using narrow-angle images, the three-dimensional coordinates of feature points that appear only in wide-angle images are also calculated, so that three-dimensional coordinates of the measurement object can be obtained in a wide-angle visual field.

Furthermore, although the case where the view angle is alternately switched between the narrow view angle and the wide view angle when images are taken is described above as an example, this is not restrictive. As another unrestrictive example, the view angle may also be switched so that images with the narrow view angle or images with the wide view angle are consecutively taken. In that case, it suffices that the translational vector and the rotation matrix of the image pickup device at the time of the image-taking of a narrow-angle image be found by linearly interpolating the translational vector and the rotation matrix regarding the wide-angle images taken before and after the narrow-angle image, or the two wide-angle images taken before the narrow-angle image, or the two wide-angle images taken after the narrow-angle image.

Furthermore, although the case described above is one in which when a translational vector and a rotation matrix are to be found regarding each of two narrow-angle images, the translational vectors and the rotation matrices thereof are calculated by using a wide-angle image commonly for both the images are interpolated, this is not restrictive. As another unrestrictive example, it is permissible that a translational vector and a rotation matrix regarding a first narrow-angle image by interpolating the translational vectors and the rotation matrices be calculated through the use of a first wide-angle image and a second wide-angle image, and that a translational vector and a rotation matrix regarding the second narrow-angle image by interpolating the translational vectors and the rotation matrices be calculated through the use of a third wide-angle image and a fourth wide-angle image. In that case, it is appropriate that a wide-angle image that serves as a reference be determined (e.g., a first wide-angle image be used as a reference), and that the translational vector and the rotation matrix between the first and second narrow-angle images be calculated on the basis of the translational vector and the rotation matrix between the reference wide-angle image and the first narrow-angle image, and the translational vector and the rotation, matrix between the reference wide-angle image and the second narrow-angle image, and the translational vectors and the rotation matrices individually regarding the first and second narrow-angle images. It is also permissible that the translational vector and the rotation matrix regarding the first narrow-angle image and the translational vector and the rotation matrix regarding the second narrow-angle image be calculated by linearly interpolating the translational vector and the rotation matrix between the two wide-angle images.

Although the case where the monocular camera is used as an image pickup device is described above as an example, it is also permissible to use a multi-lens camera that includes a camera for taking an image with a wide view angle and a camera for taking an image with a narrow view angle. In that case, it is appropriate that the cameras of the multi-lens camera not independently move but uniformly change in position and posture.

Furthermore, although the case described above is one in which the three-dimensional coordinates of corresponding points on a measurement object are measured and output as an example, it is also permissible that the distance from the vehicle to the corresponding point be measured on the basis of measured three-dimensional coordinates, and the measured distance be output.

Still further, although the case described above is one in which corresponding points are retrieved from two narrow-angle images, this is not restrictive. It is also permissible to retrieve corresponding points from three or more narrow-angle images. In the case where corresponding points are retrieved from three narrow-angle images, points that are in correspondence between the first narrow-angle image, the second narrow-angle image, and the third narrow-angle image are retrieved by retrieving corresponding points that are in correspondence between the first narrow-angle image and the second narrow-angle image and retrieving corresponding points that are in correspondence between the second narrow-angle image and the third narrow-angle image. Then, the three-dimensional coordinates are calculated from the coordinates of the corresponding points in the first narrow-angle image and the second narrow-angle image, and the three-dimensional coordinates are calculated from the coordinates of the first narrow-angle image and the third narrow-angle image. In the case where the two three-dimensional coordinates calculated as described above have only a small deviation therebetween, the three-dimensional coordinates calculated from the first narrow-angle image and the third narrow-angle image which are the most apart from each other can be adopted as a correct measured value. On the other hand, in the case where the two three-dimensional coordinates calculated have a large deviation, the two calculated three-dimensional coordinates can be discarded as it is considered that there is an error in the correspondence between corresponding points.

Furthermore, although in conjunction with the foregoing embodiment or example the case where the translational vector and the rotation matrix are calculated as factors that represent changes in the position and posture of the image pickup device is described above as an example, this is not restrictive. As another unrestrictive example, it is also permissible to calculate another indicator as a factor that represents changes in the position and posture of the image pickup device.

Next, a second embodiment or example will be described. Portions of the second embodiment that have substantially the same constructions as those of the first embodiment are assigned with the same reference characters, and descriptions thereof will be omitted.

The second embodiment is different from the first embodiment in that the image-taking interval is determined on the basis of the three-dimensional coordinates of a corresponding point on a measurement object that was previously measured.

Figure 5:
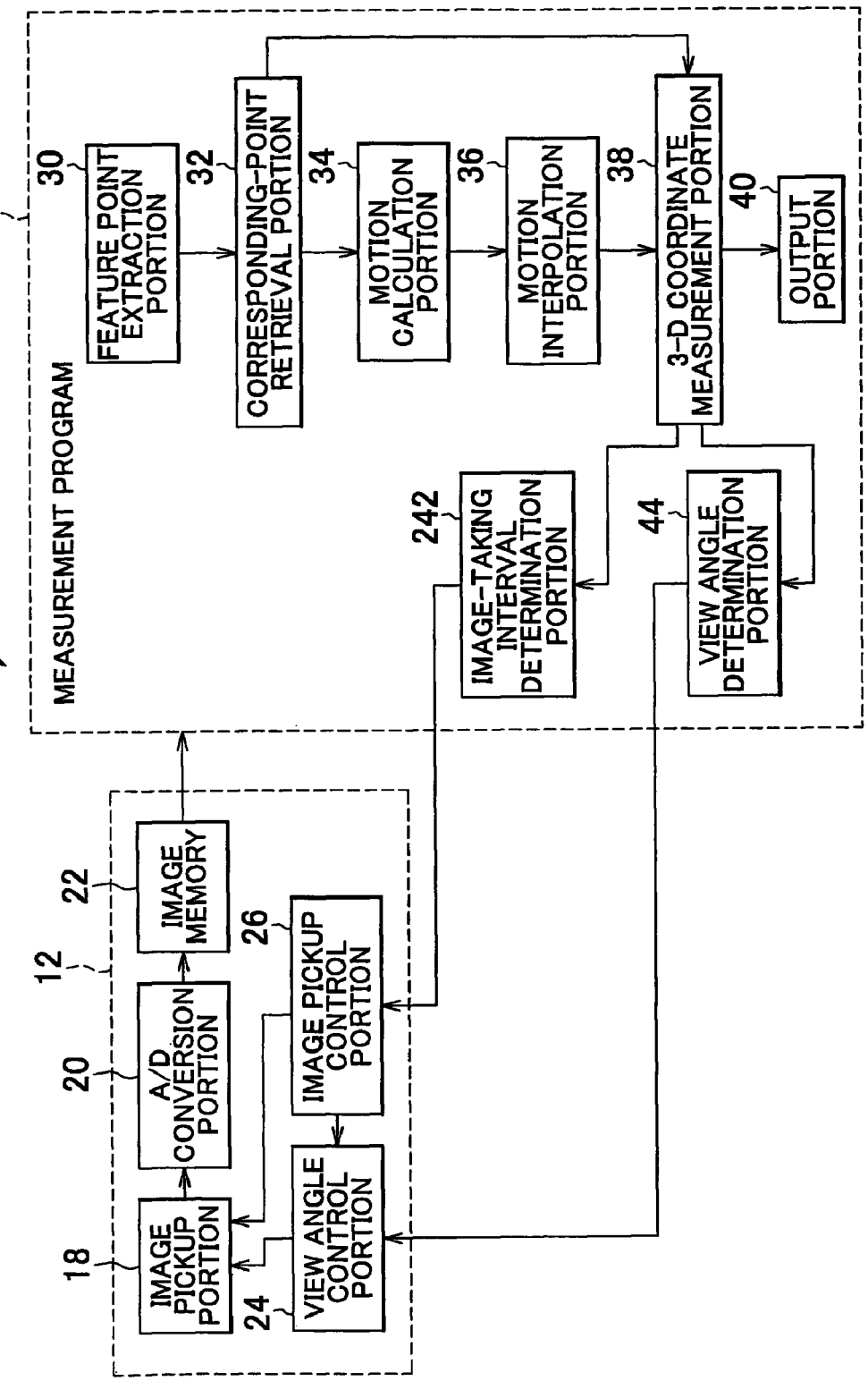
FIG. 5 is a block diagram showing a measurement device in accordance with a second embodiment of the invention.

As shown in FIG. 5, a measurement device 210 in accordance with the second embodiment includes an image pickup device 12 and a computer 216. A measurement program stored in the computer 216 includes computer executable program code to operate as: a feature point extraction portion 30; a corresponding-point retrieval portion 32; a motion calculation portion 34; a motion interpolation portion 36; a three-dimensional coordinates measurement portion 38; an output portion 40; an image-taking interval determination portion 242 that determines the image-taking interval of the image pickup device 12 on the basis of the three-dimensional coordinates of the measurement object previously measured by the three-dimensional coordinates measurement portion 38; and a view angle determination portion 44.

The image-taking interval determination portion 242 determines as an image-taking interval a time such that the average or maximum value of the predicted value of the movement amount in images of corresponding points between images with a wide view angle becomes greater than or equal to a threshold value, on the basis of the previously measured three-dimensional coordinates of the measurement object. For example, the greater the distance of the measurement object from the vehicle obtained from the previously measured three-dimensional coordinates of the measurement object, the less the predicted value of the movement amount, and therefore a correspondingly longer image-taking interval time is determined so as to increase the image-taking interval so that the average or maximum value of the predicted values of the movement amount in images of corresponding points between images with the wide view angle becomes greater than or equal to the threshold value.

Figure 6:
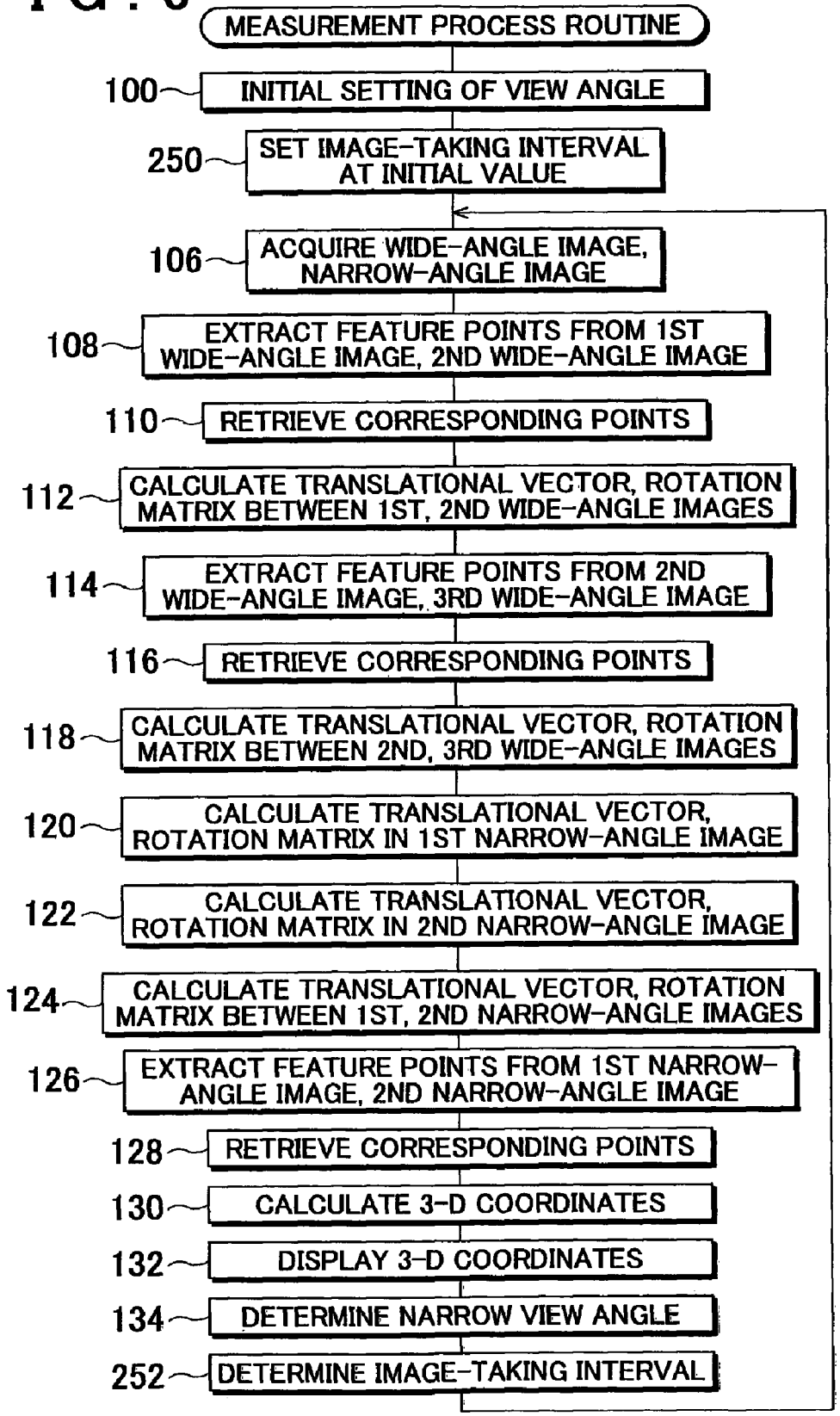
FIG. 6 is a flowchart showing a measurement process routine in the measurement device in accordance with the second embodiment of the invention.

Next, a measurement process routine in accordance with the second embodiment or example will be described with reference to FIG. 6. The measurement process routine of FIG. 6 can be implemented as computer executable code stored in or on a computer readable medium such as an optical disk, magnetic disk, ROM, RAM, etc. Processes that are substantially the same as those in the first embodiment are assigned with the same reference characters, and detailed descriptions thereof will be omitted.

Firstly, in step 100, as an initial setting, the wide view angle and the narrow view angle are set at their respective predetermined maximum view angles of the image pickup portion 18. Then, in step 250, the image-taking interval time t is set at an initial value, and the image-taking interval of the image pickup device 12 is controlled so that images are serially taken at the image-taking interval time t set at the initial value.

Subsequently in step 106, a first wide-angle image, a first narrow-angle image, a second wide-angle image, a second narrow-angle image and a third wide-angle image are sequentially acquired from the image pickup device 12. Then, in step 108, a plurality of feature points are extracted from each of the first wide-angle image and the second wide-angle image. In step 110, at least eight sets of corresponding points that are in correspondence between the first wide-angle image and the second wide-angle image are retrieved. Subsequently in step 112, the translational vector and the rotation matrix that represent the changes in the position and posture of the image pickup device 12 at the time of the image-taking of the second wide-angle image with reference to the position and posture of the image pickup device 12 occurring at the time of the image-taking of the first wide-angle image are calculated.

Subsequently in step 114, a plurality of feature points are extracted from each of the second wide-angle image and the third wide-angle image. In step 116, at least eight corresponding points that are in correspondence between the second wide-angle image and the third wide-angle image are retrieved. Subsequently in step 118, the translational vector and the rotation matrix that represent the changes in the position and posture of the image pickup device 12 at the time of the image-taking of the third wide-angle image with reference to the position and posture of the image pickup device 12 occurring at the time of the image-taking of the second wide-angle image are calculated.

Subsequently in step 120, the translational vector and the rotation matrix that represent the changes in the position and posture of the image pickup device 12 at the time of the image-taking of the first narrow-angle image are calculated. Next, in step 122, the translational vector and the rotation matrix that represent the changes in the position and posture of the image pickup device 12 at the time of the image-taking of the second narrow-angle image are calculated. Then, in step 124, the translational vector and the rotation matrix that represent the changes in the position and posture of the image pickup device 12 at the time of the image-taking of the second narrow-angle image with reference to the position and posture of the image pickup device 12 occurring at the time of the image-taking of the first narrow-angle image are calculated.

Next, in step 126, a plurality of feature points are extracted from each of the first narrow-angle image and the second narrow-angle image. In step 128, at least one set of corresponding points that are in correspondence between the first narrow-angle image and the second narrow-angle image are retrieved. Next, in step 130, the three-dimensional coordinates of the feature point on the measurement object indicated by the corresponding points are calculated. In step 132, the calculated three-dimensional coordinates of the feature point on the measurement object are displayed in the display of the computer 16.

Then, in step 134, a narrow view angle is determined on the basis of the three-dimensional coordinates calculated in step 134, and the narrow view angle of the image pickup device 12 is controlled so as to become equal to the determined narrow view angle. Next, in step 252, the image-taking interval time is determined on the basis of the three-dimensional coordinates calculated in step 134, and the image-taking interval of the image pickup device 12 is controlled so as to become equal to the determined image-taking interval time. Therefore, while the angle view is being switched between the set wide view angle and the newly determined narrow view angle, an image with the wide view angle and an image with the narrow view angle are alternately taken with the newly determined image-taking interval time t. Then, the process goes back to step 106, in which the three-dimensional coordinates of the feature point on the measurement object at the next measurement timing are measured on the basis of an image with the set wide view angle and an image with the newly determined narrow view angle.

Thus, the longer the previously measured distance of the previously measured three-dimensional coordinates from the vehicle, the longer the image-taking interval, so that the movement of a corresponding point retrieved from the images is suitably made larger. Therefore, the accuracy of estimation of the motion of the image pickup device can be improved.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. A measurement device comprising:
an image pickup portion mounted in a mobile unit that outputs a plurality of images that are taken with a first view angle and that contain a measurement object and a plurality of images that are taken with a second view angle smaller than the first view angle and that contain the measurement object;
a retrieval portion that retrieves, from at least two images taken with the second view angle by the image pickup portion, points that are each a feature point on the measurement object and that are in correspondence between the at least two images taken with the second view angle;
a position and posture calculation portion that, on a basis of the plurality of images taken with the first view angle by the image pickup portion, calculates a relative relationship of a position and a posture of the image pickup portion occurring at each of times of image-taking of the plurality of images taken with the first view angle;
a position and posture estimation portion that, on a basis of the relative relationships of the positions and the postures calculated by the position and posture calculation portion, estimates the relative relationships of the positions and the postures of the image pickup portion occurring at the times of image-taking of the at least two images with the second view angle; and
a position measurement portion that measures a three-dimensional position of the points retrieved by the retrieval portion, on a basis of the retrieved points and the relative relationships of the positions and the postures estimated by the position and posture estimation portion.

2. The measurement device according to claim 1, wherein the image pickup portion serially takes images of the measurement object while switching a view angle from one of the first view angle and the second view angle to another one of the first view angle and the second view angle.

3. The measurement device according to claim 2, wherein the image pickup portion alternately takes an image with the first view angle and an image with the second view angle.

4. The measurement device according to claim 1, wherein the position and posture calculation portion retrieves, from two images taken with the first view angle by the image pickup portion, at least eight sets of points that are feature points and that are in correspondence between the two images, and calculates the relative relationship of the position and the posture of the image pickup portion at each of the times of image-taking of the two images on a basis of the at least eight sets of points retrieved.

5. The measurement device according to claim 4, wherein a three-dimensional position is measured with regard to a point that is not in any image taken with the second view angle but that is in images taken with the first view angle, and the position measurement portion retrieves, from the two images taken with the first view angle from which the points that are in correspondence have been retrieved by the position and posture calculation portion, points that are feature points and that are in correspondence between the two images, and measures the three-dimensional positions of the retrieved points on a basis of the retrieved points and the relative relationships between the positions and the postures calculated by the position and posture calculation portion.

6. The measurement device according to claim 4, wherein the relative relationship of the position and the posture includes a displacement amount and a rotation amount.

7. The measurement device according to claim 4, wherein each set of the at least eight sets of points is different in movement from other at least seven sets of points.

8. The measurement device according to claim 1, wherein the relative relationships of the position and the posture include a displacement amount in three axis directions and a rotation amount with reference to three axes.

9. The measurement device according to claim 1,
wherein the retrieval portion retrieves, from a first image taken with the second view angle by the image pickup portion and a second image taken with the second view angle by the image pickup portion after the first image is taken, points that are each a feature point on the measurement object and that are in correspondence between the first image and the second image, and
wherein the position and posture calculation portion calculates a first displacement amount in three axis directions and a first rotation amount with reference to three axes which represent relative relationships between the position and the posture of the image pickup portion occurring when a third image is taken with the first view angle by the image pickup portion before the first image is taken, and the position and the posture of the image pickup portion occurring when a fourth image is taken with the first view angle by the image pickup portion between the image-taking of the first image and the image-taking of the second image, and
wherein the position and posture calculation portion calculates a second displacement amount in the three axis directions and a second rotation amount with reference to the three axes that represents relative relationships between the position and the posture of the image pickup portion occurring when the fourth image is taken and the position and the posture of the image pickup portion occurring when a fifth image is taken with the first view angle by the image pickup portion after the second image is taken, and
wherein the position and posture estimation portion estimates a third displacement amount and a third rotation amount that represent the relative relationships between the position and the posture of the image pick up portion occurring when the first image is taken and the position and the posture of the image pickup portion occurring when the second image is taken, on a basis of the first displacement amount, the second displacement amount, the first rotation amount, and the second rotation amount that are calculated by the position and posture calculation portion.

10. The measurement device according to claim 9, wherein the position and posture calculation portion retrieves, from the third image and the fourth image, at least eight sets of points that are feature points and that are in correspondence between the third image and the fourth image, and calculates, on a basis of the retrieved at least eight sets of points, the first displacement amount and the first rotation amount that represent the relative relationships between the positions and the postures of the image pickup portion occurring at the times of image-taking of the third image and the fourth image, and retrieves, from the fourth image and the fifth image, at least eight sets of points that are feature points and that are in correspondence between the fourth image and the fifth image, and calculates, on a basis of the retrieved at least eight sets of points, the second displacement amount and the second rotation amount that represent the relative relationships between the positions and the postures of the image pickup portion occurring at the times of the image-taking of the fourth image and the fifth image.

11. The measurement device according to claim 1, wherein the position measurement portion serially measures the three-dimensional position, the device further comprising:
a view angle determination portion that determines the second view angle so that the greater a distance of the three-dimensional position previously measured from the mobile unit, the smaller the view angle.

12. The measurement device according to claim 1, further comprising:
a velocity measurement portion that measures a traveling speed of the mobile unit; and
an image pickup control portion that controls the image pickup portion so that the lower the traveling speed measured by the velocity measurement portion, the longer the image-taking interval of the image pickup portion.

13. The measurement device according to claim 1,
wherein the position measurement portion serially measures the three-dimensional position, the device further comprising:
an image pickup control portion that controls the image pickup portion so that the greater a distance of the three-dimensional position previously measured from the mobile unit, the longer the image-taking interval of the image pickup portion.

14. A measurement method for a mobile unit including an image pickup portion, comprising:
outputting a plurality of images that are taken by the image pickup portion with a first view angle and that contain a measurement object and outputting a plurality of images that are taken by the image pickup portion with a second view angle smaller than the first view angle and that contain the measurement object;
retrieving, from at least two images taken with the second view angle by the image pickup portion, points that are each a feature point on the measurement object and that are in correspondence between the at least two images taken with the second view angle;
calculating, on a basis of the plurality of images taken with the first view angle by the image pickup portion, a relative relationship of a position and a posture of the image pickup portion occurring at each of times of image-taking of the plurality of images taken with the first view angle;
estimating, on a basis of the relative relationships of the positions and the postures calculated, the relative relationship of the position and the posture of the image pickup portion occurring at the times of image-taking of the at least two images with the second view angle; and
measuring a three-dimensional position of the points retrieved, on a basis of the retrieved points and the relative relationship between the position and the posture estimated.

15. A computer readable medium including computer executable code to cause a computer in a mobile unit including an image pickup portion to:
output a plurality of images that are taken by the image pickup portion with a first view angle and that contain a measurement object and output a plurality of images that are taken by the image pickup portion with a second view angle smaller than the first view angle and that contain the measurement object;

retrieve, from at least two images taken with the second view angle by the image pickup portion, points that are each a feature point on the measurement object and that are in correspondence between the at least two images taken with the second view angle;

calculate, on a basis of the plurality of images taken with the first view angle by the image pickup portion, a relative relationship of a position and a posture of the image pickup portion occurring at each of times of image-taking of the plurality of images taken with the first view angle;

estimate, on a basis of the relative relationships of the positions and the postures calculated, the relative relationship of the position and the posture of the image pickup portion occurring at the times of image-taking of the at least two images with the second view angle; and measure a three-dimensional position of the points retrieved, on a basis of the retrieved points and the relative relationship between the position and the posture estimated.

* * * * *